United States Patent [19]

Baum et al.

[11] 3,998,626
[45] Dec. 21, 1976

[54] METHOD FOR AIR POLLUTION CONTROL COMBINED WITH SAFE RECOVERY AND CONTROL OF GASES FROM A BOTTOM-BLOWN STEEL CONVERTER VESSEL

[75] Inventors: Kurt Baum; Joerg Peter Baum, both of Essen-Sud, Germany; Jai Kumar Pearce; David Lee Schroeder, both of Pittsburgh, Pa.

[73] Assignee: Pennsylvania Engineering Corporation, Pittsburgh, Pa.

[22] Filed: Mar. 11, 1975

[21] Appl. No.: 557,360

Related U.S. Application Data

[60] Division of Ser. No. 340,302, March 12, 1973, Pat. No. 3,908,969, which is a continuation of Ser. No. 209,953, Dec. 20, 1971, abandoned.

[52] U.S. Cl. .................................. 75/60; 75/61
[51] Int. Cl.² ............................................ C21C 5/38
[58] Field of Search ................................ 75/60, 61

[56] References Cited

UNITED STATES PATENTS

| 3,655,361 | 4/1972 | Brown | 75/60 |
| 3,707,069 | 12/1972 | Pike | 75/60 |
| 3,799,763 | 3/1974 | Dortenzo | 75/60 |
| 3,844,769 | 10/1974 | Calderon | 75/60 |

Primary Examiner—P. D. Rosenberg
Attorney, Agent, or Firm—Fred Wiviott

[57] ABSTRACT

A gas collector hood is located close to the mouth of a converter vessel and has a diameter which is not much greater than the mouth of the vessel. A mixture of oxygen together with entrained powdered materials based on process requirements and a hydrocarbon fluid as cooling agent are blown through tuyeres in the bottom of the vessel and diffuse through the hot metal in the vessel. The inherently finer dust produced from the bottom-blown oxygen process requires that for proper air pollution control a non-combustion system be used to take advantage of the increased agglomerating properties of iron oxides when produced in reducing atmospheres. When blowing is initiated in this process carbon monoxide and hydrogen evolve immediately and in order to render the gases inert, air is aspirated into the gas collector hood so that an inert gas plug is formed which purges the exhaust system of combustion air. A short time after blowing is initiated, the hood is brought down to proximity with the vessel in which case only a small percentage of the theoretically required air for combustion is aspirated. Nitrogen is injected as required into the hood in addition to air aspirated to artificially create inertization to turn down a heat at high carbon levels, for emergency vessel turn down, and for special heats. Near the end of a normal low carbon heat, air is again aspirated into the hood so that an inert gas plug is formed for safe turn down of the converter. Control of the system is achieved through high response sensors based on a gas analysis system independent of the components and products of combustion in the gas phase, operated together with automatic suction control incorporated as part of the gas cleaning system.

32 Claims, 4 Drawing Figures

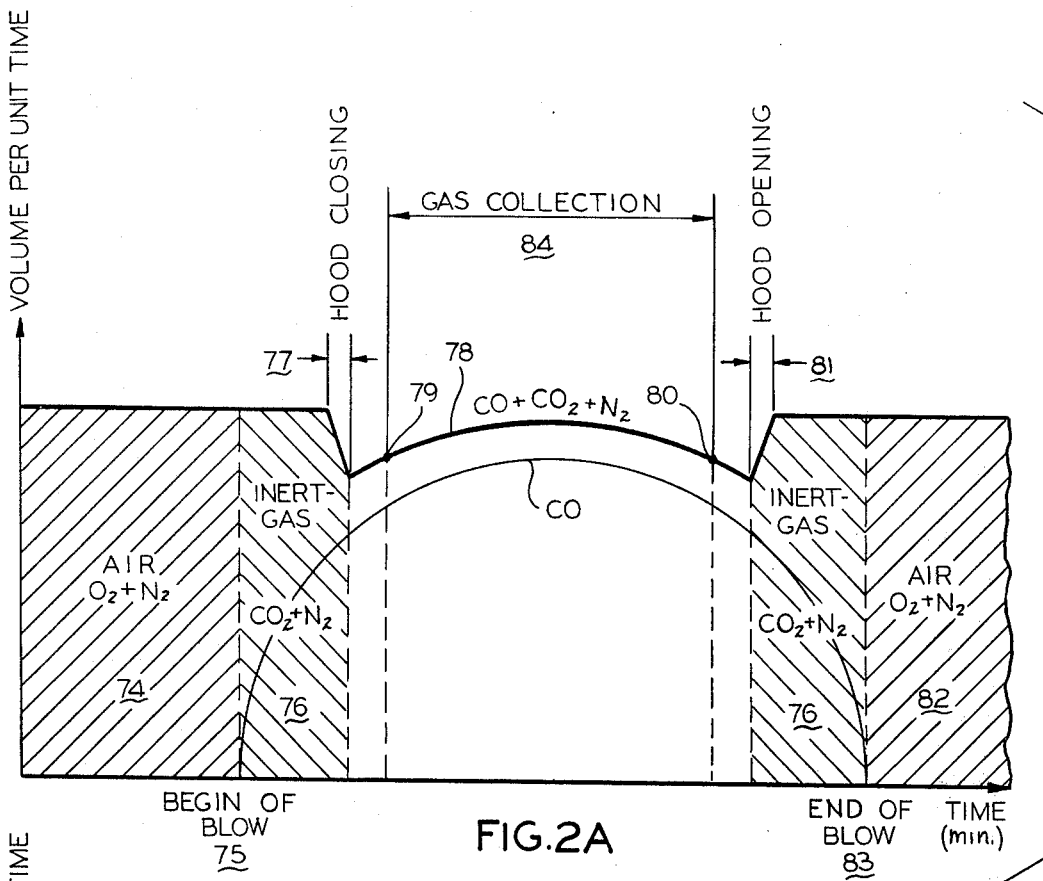
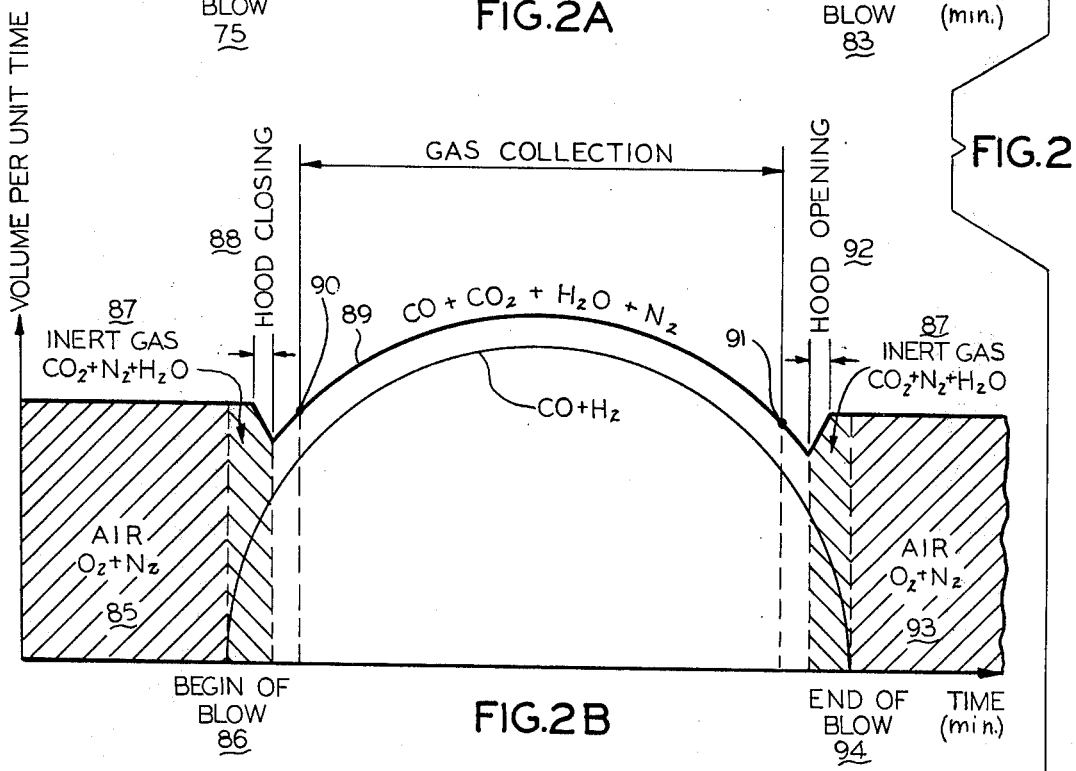

METHOD FOR AIR POLLUTION CONTROL COMBINED WITH SAFE RECOVERY AND CONTROL OF GASES FROM A BOTTOM-BLOWN STEEL CONVERTER VESSEL

This is a division of application Ser. No. 340,302, filed Mar. 12, 1973, now U.S. Pat. No. 3,908,969, and which in turn is a continuation of application Ser. No. 209,953 filed Dec. 20, 1971, now abandoned.

BACKGROUND OF THE INVENTION

The present invention pertains to the bottom-blown oxygen steel-making method of converting impure molten iron to steel and is particularly concerned with safe and economic collection of the gases which are evolved in the process and which have to be cleaned before discharge to the atmosphere and/or used as fuel. The analysis of the gases is used to control the collection and gas cleaning.

In the bottom-blown oxygen steelmaking process, with which the present invention is concerned, the refractory lined converter vessel has tuyeres in its bottom so that oxygen, other gases such as hydrocarbon cooling fluids, and powdered fluxes and other additives needed for the conversion process may be introduced through the bottom of the vessel and diffused through the melt. This contrasts with the well-established top-blown oxygen conversion process where oxygen is injected into the melt by means of a lance which extends through the mouth of the vessel to near the surface of the melt. In the top-blown process, the fluxes and other materials are also admitted through the mouth of the vessel to the top surface of the melt.

In both the top and bottom-blown processes, oxygen ($O_2$) reacts with silicon, manganese, carbon and phosphorus in the melt during the blowing period. In the bottom-blown process, oxygen ($O_2$) also reacts with hydrogen resulting as a decomposition product from the hydrocarbon fluids injected in the bottom. the duration of blowing or end point of the heat is indicated by the reduction of carbon oxidation products ($CO$ & $CO_2$) in the evolved gases which means that the carbon content of the melt has been reduced to the desired level and that the melt may be poured provided that is temperature is correct.

In both processes gases are evolved during the blow period. The primary gases in the bottom-blown processes are carbon monoxide ($CO$), carbon dioxide ($CO_2$), hydrogen ($H_2$) and water vapor ($H_2O$) which may vary in proportion as the melt proceeds. In general these primary gases are directed into a hood over the vessel. The hood is spaced from the vessel so air enters and burns the $CO$ and $H_2$ in the gas and the products of combustion are conducted through an off-gas cleaning system with an exhaust fan, and then led to a chimney and discharged to the atmosphere as waste.

In such a combustion system, iron vaporized from the bath in localized high temperature zones, and such iron that is discharged as oxide, is completely oxidized to red fume ($Fe_2O_3$) and diluted by combustion air and excess air. The gas cleaning system required to clean such fine red fume and high volumes of resulting off-gases is voluminous and costly due to high fan capacity and power consumption resulting from high pressure drop required to achieve air pollution standards.

The bottom-blown oxygen process in comparison to the top-blown, is characterized by a smaller percentage of iron vaporized but in an extremely fine dispersion of the iron particles. Therefore, a non-combustion system has to be used in order to avoid oxidation and further dilution with air, and to take advantage of the increased agglomeration and wetting properties of dust particles comprised largely of non or semi-oxidized iron ($Fe$, $FeO$ and $Fe_3O_4$) prevailing under reducing conditions. Besides the economic advantages of such a system, it provides the release of the lowest possible gas volumes with minimum concentration of dust in the exhausted stack gases. This ensures that all applicable pollution code standards can be economically met.

An associated objective of such a non-combustion gas cleaning system in conjunction with the bottom-blown oxygen steelmaking process, is the safe capture and possible utilization of relatively high calorific value off-gases produced during the blow. This is achieved through automatic switching in such manner that during the beginning and end of a blow, when off-gases have a relatively low calorific value, they are cleaned and discharged to a waste gas stack equipped with a torch burner; while during interim periods of the blow when the off-gases have a high calorific value they are cleaned and stored for external utilization. There are thus three distinct periods. A first period of exhaust and discharge to the atmosphere, a second period of collection of gases for use, and a third period when gases are again exhausted and discharged to the atmosphere. By controlling the duration of the second period of collection it is possible to obtain a gas the calorific value of which can be set at various desired values.

In this invention a scheme is proposed for avoiding combustion of the evolved gases in the bottom-blown process and particularly for collecting the gases when the $CO$ and $H_2$ concentration is about 30% at which time the gas mixture is combustible. This gas mixture is therefore subject to combustion and even explosion in the hood and gas cleaning system if sufficient oxygen is present. The problem with collecting the evolved reaction gases is that the gases are at about 1400°–1600° C at the mouth of the vessel and would further increase with combustion at the air gap between vessel mouth and hood. Gases must therefore be cooled sufficiently by radiation to about 1100° C in order to reduce the steam content that would otherwise result from subsequent quenching in the wet gas cleaning system. Cooling is effected by using a water cooled hood and stack in order to lower the temperature of the gas mixture. If required, under special circumstances when unusually high $CO$ and $H_2$ evolution occurs early in the heat, nitrogen will be injected in the hood for inertization of the primary gases to a non-explosive level, and simultaneously providing the benefits of cooling.

The safe capture and efficient operation of the gas cleaning system and complete collection of gases therefore requires that combustion at the air gap between hood and vessel mouth be kept to a minimum after taking necessary precautions to ensure that no explosive conditions are prevalent in the system. Furthermore, controls are required to avoid leakage of gas and fumes to the atmosphere in the gap between vessel and hood resulting from process variations and fluctuations in evolved gas volumes within the vessel. Hitherto, this has been a major disadvantage in full combustion systems where such control is not possible and consequently adds to air pollution.

SUMMARY OF THE INVENTION

An object of the present invention is to provide a means for economic and efficient pollution control on a bottom-blown oxygen converter vessel, with simultaneous provisions for safe capture and collection of uncombusted high calorific value waste gases. The benefits derived from use of such collected gases will significantly enhance economics by reducing the costs required to meet air pollution standards.

A further object is to provide a method for operating the oxygen converter vessel so that gas combustion does not occur at the vessel mouth and, hence, the evolved gases can be analyzed and used to control or indicate the status of the heat.

Another object is to use ratios of the concentrations of different gases for developing indicia and functionally related electric signals which are used to control the gas collection and cleaning system and to indicate the status of the melt.

Another object is to have the gas analysis system be independent of the components and products of combustion of the gas phase such as hydrogen, water vapor, carbon monoxide and carbon dioxide normally prevalent in the bottom-blown oxygen process using hydrocarbon fluids. Such analysis system providing for the necessary high response signals to enable control that is compatible with fluctuations within the process.

A further object is to use the relatively rapid measurement of oxygen partial pressure (less than one second) as a means to determine the combustion stoichiometry of the gas phase and to utilize such signals to control the gas collection and cleaning process.

A further object is to combine the oxygen partial pressure sensor together with an infra-red sensor (which measures CO, $CO_2$ and $H_2O$ within a sensor response of less than 5 seconds) to determine and control calorific value of the off-gases and for control of automatic switching to collect gases of pre-determined heating value from bottom-blown oxygen steelmaking vessels using hydrocarbon fluids.

Another object is to use the combined signals from the oxygen partial pressure and infra-red sensors to control the movements of a hood skirt which sets the size of air gap between the hood and the vessel mouth.

Still another object is to control the size of the gap between the hood and vessel mouth as well as the suction or negative pressure of the gas stream within the hood which leads the gases away from the vessel so that limited air is drawn into the combustible gas stream.

Yet another object is to use the signals from the gas analysis system together with signals from the pressure control system as a means to supervise system control.

Still another object is to provide a method which will permit voluntary or involuntary safe stopping of the blowing process where levels of CO and $H_2$ in gases are high such as is the case when high carbon heat is to be made, and when inertization of gases in the system are required to prevent explosion on turn down.

Yet another object is to use the signals from the oxygen pressure sensor to detect the presence of free oxygen when high CO and $H_2$ conditions prevail to initiate nitrogen injection for safety inertization.

Yet another object is to provide for additional air pollution devices integrated with the main gas collection and cleaning system that will collect fumes when the bottom-blown oxygen vessel is in a non-blowing position tilted away from the vertical and is out of coincidence with the main collection hood.

How these and other more specific objects are achieved will appear from time to time in the detailed description of an illustrative embodiment of the invention which will be set forth hereinafter.

In accordance with the invention, a bottom-blown oxygen converter vessel is equipped with a water-cooled gas collecting hood. There is a small gap between the vessel and hood when the blowing process is underway. The hood is connected to a duct and gas cleaning apparatus through an exhaust fan which delivers a relatively constant pressure over a range of off-gas flow rates. Since the gas evolution from the process is varying over the blow period, the air aspirated through the gap between vessel mouth and hood must be controlled. This is done by means of varying and setting the air gap between vessel mouth and hood through a moveable hood skirt, and then providing for finer operational corrections through flow control obtained by varying the adjustable throat section of the venturi scrubber incorporated as part of the gas cleaning system. During the first minute or two of the oxygen blow, when the quantity of evolved gases is low, CO and $H_2$ evolution is relatively low. Air aspirated in the gap with skirt in a raised position permits full combustion to $CO_2$ and $H_2O$, the remainder being nitrogen. The mixture of $CO_2$ and $H_2O$ and $N_2$ is inert and non-combustible. At this stage the gas acts like an inert plug which flows through the gas cleaning system and apparatus, purging it of oxygen for combustion. The inert plug of gas is directed to a waste stack.

An oxygen partial pressure sensor, $PO_2$, detects when the stoichiometric combustion point of the gases is reached. At this point the vessel hood skirt is lowered and safe capture of waste gases for exhaust to the stack burner may be initiated without a danger of explosion.

More specifically, as the initial period of a heat progresses, the combined CO and $H_2$ concentration of the evolved gases increases markedly and combined $CO_2$ and $H_2O$ concentration decreases. Since the volume of gas flow in this initial period is set by a pre-set position of the variable venturi throat, air intake must necessarily be reduced at this time. The oxygen partial pressure sensor detects the stoichiometric combustion point and thereby the absence of oxygen in the system and causes the hood to be lowered to a point at which the pressure drop in the gap between vessel mouth and hood skirt will create a negative pressure within the hood that corresponds to a pre-set pressure value in the range of $-3$ to $-8$ mm W.G. This provides a means for automatic closure of the hood skirt in a safe manner much earlier in the blow period than has hitherto been possible. The result is the ability to safely collect larger volumes of combustible gas per ton of steel produced. At the same time, if collection is not considered, the fact that this control means limits combustion provides advantages of safety and economy through lower heat load and gas flow rates prevailing in the early stages of the blow and thereby resultant decrease in power consumption per ton of steel of gas cooling and cleaning.

Once the hood skirt is lowered to provide the required pre-set negative pressure at the initially fixed venturi throat low gas flow position, as gas flows from the process increase, the movements of the variable venturi throat are used for finer operational corrections to maintain the pre-set negative pressure at levels in the range of $-3$ to $-8$ mm W.G. The signals controlling the movement of the venturi throat are based on hood pressure supervised by gas analysis system signals in relation to the desired pre-set calorific value required. Such controls have the advantage of providing system sensitivity that will avoid pulsations of evolved gases through the air gap to the atmosphere which causes air pollution and simultaneously provides a combustible gas of desired calorific value. In cases where major fluctuations in flow rate occur, the hood skirt system will become operable together with the venturi throat control to make the system self-adapting and highly responsive to major changes.

Additionally, the calorific value measurements from the infra-red sensor are monitored and used for automatic and/or manual switching of off-gases for collection and storage when a pre-set value for collection is reached.

When the blow progresses toward its end-point, the combined concentration of CO and $H_2$ decreases, calorific value drops and on reaching the pre-determined limiting value as monitored by the infra-red sensor, causes automatic switching to the waste gas stack.

When the blow is near the end-point, the combined concentrations of CO and $H_2$ decrease and those of $CO_2 + H_2O$ increase. The rate of gas flow at this time is controlled by the variable venturi throat. As air is aspirated through the air gap and once again conditions for stoichiometric combustion occur, this condition is sensed by the oxygen partial pressure sensor which initiates the signal for hood opening by movement of the hood skirt.

The above described control system again becomes operative towards the end of the blow, permitting automatic opening of the hood late in the blow which provides for safety and economy as attributed to the early stages of the blow.

In case of high carbon heats, turn down is done at a period in the blow when high concentrations of CO + $H_2$ exist and opening of the hood could result in explosive conditions due to air aspirated from the atmosphere. On such heats injection of nitrogen into the hood for dilution and inertization is done. This nitrogen injection is automatically initiated through mechanical coupling with the vessel tilt drive. As required the same control system will be used to raise and lower the vessel on nitrogen to minimize fume generation.

Additionally, the same nitrogen injection for safety inertization will be triggered by signals from the partial oxygen pressure sensor used to monitor and detect approach of potential explosive conditions in the gas collection and cleaning system.

Additional pollution control devices are provided that become operational during vessel turn-down and during charging and tapping operations such as when the vessel is partially or fully non-coincident with the main collection hood. These devices will be comprised of auxiliary hoods around or on either side of the main hood. Such a hood assembly will be connected through a duct to the inlet of the secondary variable throat venturi scrubber. A motor operated shut-off valve will be provided in this duct. As the vessel is turned down from a vertical to a horizontal position a position indicator signals the progressive opening of the shut-off valve in the auxiliary duct and simultaneous and progressive closure of the primary venturi throat to a final pre-set minimum opening. This transfers the suction of the exhaust fan from the main hood to the auxiliary hood. Fumes drawn off in the auxiliary hood are cleaned through the secondary venturi and exhausted to the atmosphere through the system stack. Fumes drawn through the main hood are cleaned through both the primary and secondary venturi scrubbers.

An illustration of the invention will now be described in reference to the drawings.

DESCRIPTION OF THE DRAWING

FIG. 2 is a graph of the primary and partially combusted off-gas volumes and gas collection volumes with respect to time.

DESCRIPTION OF A PREFERRED EMBODIMENT

Figure 1:
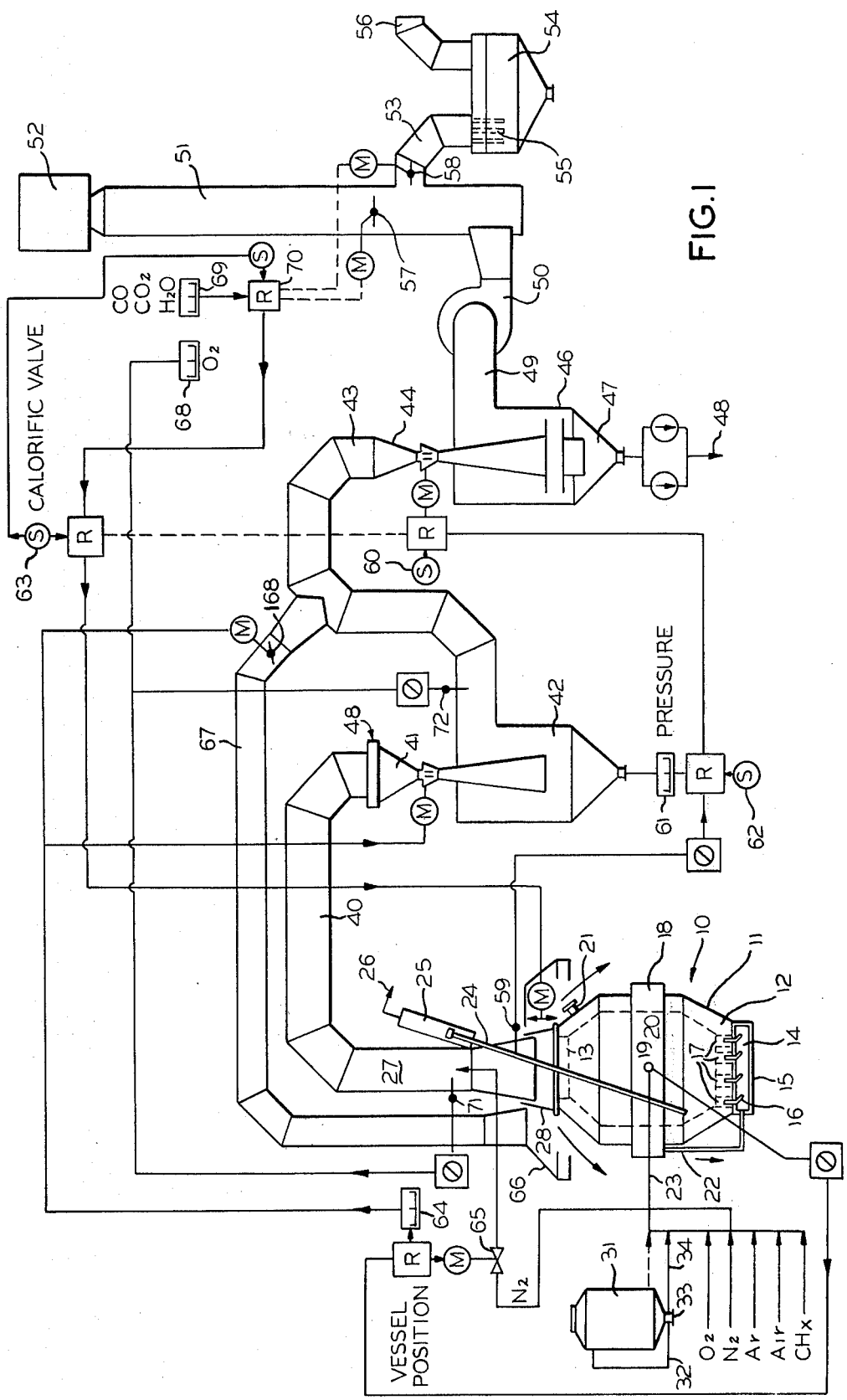
FIG. 1 is a schematic diagram of a bottom-blown steel converter system and associated gas handling equipment.

In FIG. 1 the bottom-blown converter vessel is generally designated by the reference 10. This comprises a metal shell 11 lined with refractory 12 except for its top mouth 13. At the bottom of the vessel is a housing 14 in which there is a gas and powdered material distributor box 15. These substances are injected under pressure into the molten metal within vessel 10 by means of several nozzles 16 which extend into tuyeres 17 in the bottom of the vessel. All gases and powdered solid materials which are injected in the melt diffuse upwardly through it. Intimate and extensive contact between active gases such as oxygen and the powdered flux materials results in practically stoichiometric reactions. Inert gases, of course, diffuse through the melt and arrive at the interior top of the vessel.

The vessel 10 is shown mounted conventionally on a tiltable trunnion ring 18 which has laterally extending trunnion shafts 19 and 20 that are normally journaled in supports which are not shown. Thus, the vessel 10 may be inverted on trunnion shafts 19 and 20 to discharge slag or it may be tilted substantially horizontally to discharge the molten metal through a tapping side spout 21.

Selected gases, liquids and powdered solids are delivered for injection to distributor chamber 15 at the bottom of vessel 10 through a pipe 22 that is connected to trunnion shaft 19 which is hollow. A feed pipe 23 connects to hollow trunnion shaft 19 by means of a swivel joint which is not shown. Thus, gases and materials may be injected when vessel 10 is upright and gases only may be injected when the vessel is tilted.

A thermocouple probe 24 for sensing temperature at the top center of the melt projects through vessel 10 at an angle from a reversibly moveable thermocouple support 25. The lead conductors from the thermocouple are symbolized by a line marked 26.

Above the top of the mouth of vessel 10 is a water-cooled hood 27. The hood 27 is provided with a moveable skirt 28 which can be elevated and lowered with respect to vessel 10 so as to allow an annular gap between the vessel mouth and the hood skirt for reasons which will be explained later.

Typical gases which may be injected in the bottom of vessel 10 are designated $O_2$, $N_2$, Ar (Argon), air and $CH_x$ for a hydrocarbon gas or vapor. The sources for the gases are shown connected into main feed pipe 23. Hydrocarbon fluid is always injected around the oxygen stream through tuyeres in the bottom of vessel 10. The hydrocarbon prevents premature deterioration of the bottom lining.

A typical pressurized container for storing powdered material that is to be injected into the bottom of the melt within the vessel 10 is marked with the numeral 31. In an actual installation there are several such containers for storing such powdered flux materials as lime, limestone and fluorspar as well as iron oxide, a desulphurizing agent and other additives. Oxygen is usually used to entrain and convey the powdered materials at a controlled rate. Nitrogen and other gases are used as required as well. An oxygen pipe 32 feeds into vessel 31 and a mixing device 33 from which the oxygen and the powdered material is delivered through a pipe 34 to main feed pipe 23 and ultimately to vessel 10.

The water-cooled hood 27 over vessel 10 is connected with a water-cooled hood stack 40 leading to a saturator-venturi 41 in which the evolved gases are quenched and cooled to saturation temperature at the prevailing pressure. Water is drained from a separator 42. The gases are then conducted through a pipe 43 to a second venturi scrubber 44 for final cleaning which is subject to variable flow control. The gas then goes to a droplet separator 46. The water is drained to a sump 47 and recycled to the overflow trough 48 at the inlet of saturator-venturi 41. The gas then flows through a pipe 49 to an exhaust fan 50 from where it is delivered to a stack 51 and burnt at a torch 52.

In case of gas recovery stack 51 is connected to a pipe 53 which leads to a water seal check valve 54 in which there are a plurality of pipes 55 whose ends are immersed in water so that gas cannot back up into the system. The gas which comes through pipe 53 and trap 54 in that case is the high calorific value gas comprised largely of CO and $H_2$ and some $CO_2$, $H_2O$ and $N_2$. The useful gas is conducted away through a pipe 56 to a pump and storage pressure vessel, the last two items not being shown.

Stack 51 has a damper or valve 57. The damper is controlled so that the inert gas plug, of the low calorific gas, may be selectively discharged to the atmosphere through the stack rather than pipe 53 for storage. Pipe 53 also has a damper 58 which is opened to pass the high calorific gas when such is being evolved from the vessel 10. When damper 57 is closed, damper 58 is opened and vice versa. Switching of these valves is controlled on the basis of a pre-set calorific value related to the actual readings from the combined outputs of the partial pressure sensor 68 and infra-red sensor 69.

The point of gas sampling for $PO_2$ (oxygen partial pressure) analyzer 68 and infra-red analyzer 69 (CO, $CO_2$, $H_2O$) will be either at the hood at point 71 or after the venturi scrubber 41 at point 72. Pressure sensor and its location is designated by numeral 59. Signals from the pressure sensor 59 converted to electric signals is used to control the motor that operates movements of the variable throat of secondary venturi 44.

During start of a blow the throat opening of secondary venturi scrubber 44 is pre-set by a set value indicator 60. As the CO + $H_2$ level increases and combustion takes place with aspirated air through the air gap between the hood and vessel mouth with hood skirt 28 in a raised position, the $PO_2$ analyzer 68 monitors changes in combustion conditions. When the actual point of stoichiometric combustion is reached and the presence of an inert gas plug is identified by the pronounced signal from the $PO_2$ analyzer 68, this signal is used to initiate closure of hood skirt 28. Closure of hood skirt 28 is continued through signals from the $PO_2$ analyzer 68 till such time that the pressure in the hood as measured by sensor 59 and indicated on pressure indicator 61, is equal to a pre-set negative pressure on a set value indicator 62. At this position of hood skirt 28, control of the negative pressure in the collection and cleaning system is then taken over by the variable throat of the secondary venturi 44.

The pressure signal from sensor 59 to the variable throat of secondary venturi scrubber 44 is supervised by signals from the $PO_2$ analyzer 68 and infra-red analyzer 69 giving the calorific value of the gas to maintain a pre-set calorific value set in set value indicator 63.

When the pre-set calorific value of the gases is reached, as set on set value indicator 63, the controller 70 initiates switching of valves 57 and 58 from gas exhaust to gas collection.

In the case of high carbon heats and for emergency turn down of vessel 10 at levels when high CO + $H_2$ exist, as the vessel is turned down, this condition is monitored by vessel position indicator 64 which will open nitrogen injection valve 65. Such opening will provide for a nitrogen purge for inertization of the gases in the system. Simultaneously the decreasing calorific value of the gases monitored by instruments 68 and 69 and compared with set value indicator 63, will cause controller 70 to switch valves 57 and 58 such that gases are exhausted through stack 51.

Additionally, the nitrogen injection valve 65 will be triggered by signals from the $PO_2$ analyzer 68 and infra-red analyzer 69 indicating the approach of a potential explosive emergency condition through the identified presence of oxygen with a high calorific value gas containing high CO + $H_2$ levels.

Fumes emitted during any tilting operation or during charging and tapping are collected jointly through the main hood 27 and the auxiliary hood 66 which is connected through a duct 67 via a shut off valve 98 to the inlet duct 43 of the secondary venturi scrubber 44. As the vessel 10 is tilted from the vertical, the vessel position indicator 64 causes progressive opening of shut-off valve 98 in the auxiliary hood duct 67, and the progressive closure of primary venturi scrubber throat 41 to a minimum pre-set opening accomplished through limit switches. Fumes from the auxiliary hood are thus cleaned through the secondary venturi scrubber 44 while those collected through the main hood 27 are cleaned through both venturi scrubbers 41 and 44, utilizing the main gas cleaning exhaust fan 50.

FIG. 2 illustrates the status of primary and partially combusted off-gas volumes and gas collection volumes with respect to time relative to this invention and prior art existing with other oxygen steelmaking processes. The status with respect to prior art using the top-blown oxygen steelmaking process is shown in Sketch A. Sketch A diagramatically represents the process sequence which begins with air from atmosphere purging through the system before commencement of a blow. This air serves as combustion air when a blow is initiated and forms an inert gas plug the duration of which is defined by the amount of air volume sucked into the system. For safety reasons and reasons of instrument response delay, the closure of the hood is delayed in this conventional approach and is based on a conventional oxygen analyzer providing values on actual oxygen in the gas. When oxygen levels are considered safe the hood skirt is manually closed 77 and a gas rich in CO with small amounts of nitrogen and carbon dioxide is produced as represented by curve 78. Collection of gas begins at a pre-set calorific value represented by point 79. Collection can be maintained throughout the blow till the dropping CO level produces a gas which reaches the limiting set calorific value again, and the collection is discontinued as represented by point 80. In a safe period before the end of blow the hood skirt is opened 81, allowing for full combustion of the further decreasing CO volume, thus forming an inert gas plug to purge the system before air 82 can be admitted after end of blow 83. This long inert gas plug formation period at the beginning and end results in a relatively short collection period 84 as compared to the invention described earlier and hereinafter.

The advantages of the system invented with its inherent controls are diagramatically represented in Sketch B of FIG. 2. The use of an oxygen partial pressure analyzer $PO_2$ represented earlier in FIG. 1 as numeral 68 provides a means to very distinctly measure the stoichiometric combustion point, that makes possible the rapid identification of the absence of oxygen which means the formation of an inert gas plug. The high reliability of this sensor makes it possible to operate the gas cleaning system before the beginning of the blow 86 with a smaller air volume 85. This air serves as combustion air to form the required inert gas plug 87 as discussed earlier, but the duration and total volume is significantly reduced due to the high response sensors used as described above. It further permits automatic control of the hood skirt closure 88 which is major advantage over existing practices. The gas produced is rich in CO with $H_2$ and small amounts of $H_2O$, $CO_2$ and nitrogen as represented by curve 89. Safe collection of gas commences at a pre-set calorific value represented by point 90. Collection is maintained throughout the blow and discontinued at point 91 when the limiting pre-set calorific value of off-gas is reached. The use of an infra-red sensor in series with the oxygen partial pressure analyzer provides a means for quick response to these limiting values.

The safe period for hood skirt opening 92 is again very positively identified as indicated for start of blow due to sensor 68 (FIG. 1) establishing again the presence of an inert gas plug 87. Air 93 can thus be safely admitted after end of blow 94.

We claim:

1. A method of processing off-gases from a quantity of carbon-containing molten ferrous metal and contained in a converter vessel that has an opening over which there is a movable hood means connected to gas exhaust means and which vessel has tuyere means communicating with the interior thereof at a level beneath the molten metal surface, said method including:
   delivering oxygen through said tuyere means during a first period of said process cycle to permeate said molten metal for oxidizing carbon therein wherein off-gas having a relatively small quantity of combustible constituents are produced initially,
   during a first interval of said first period maintaining a separation between said hood and said vessel sufficient to permit the inflow of sufficient air through the gap between said hood and vessel opening to oxidize said combustible constituents,
   maintaining the separation of said hood means from said vessel as combustible constituent production increases until substantially stoichiometric conditions of combustion exist between said combustible constituents and oxygen from said drawn in air thereby to produce a substantially inert gaseous mixture in said hood and exhaust means for purging said exhaust means substantially of combustible constituents, and then
   immediately commencing a reduction in the gap between said hood means and vessel opening while continuing the delivery of oxygen during a second interval of said first period commencing after the passage of said purging inert gaseous mixture through said exhaust means to thereby reduce the air drawn in so that the increased quantity of combustible constituents and other offgases produced during an ensuing continuous oxygen delivery period do not undergo substantial combustion.

2. The method set forth in claim 1 including:
   continuing to deliver oxygen through said tuyere means during an ensuing second period continuous with said first period until the quantity of combustible constituents in the off-gas from said molten metal is diminished substantially, and then
   separating said hood means a sufficient distance from said vessel opening over an interval during a third period to thereby permit drawing in sufficient air to substantially completely oxidize the combustible constituents of said off-gases and again produce a substantially inert gaseous mixture in said hood and gas exhaust means.

3. The method set forth in claim 2 including collecting the gases withdrawn from said vessel by said exhaust means during an interval commencing shortly after the end of said first period and terminating shortly before the beginning of said third period.

4. The method set forth in claim 1 and including the step of maintaining a negative pressure in said hood means relative to atmospheric pressure during the second interval of said first period.

5. The method set forth in claim 4 wherein the negative pressure in said hood means is maintained in the range of 1 millimeter to 10 millimeters in terms of a water column during said first, second and third periods.

6. The method set forth in claim 1 including the steps of drawing a substantial quantity of atmospheric air into said hood means by the operation of said gas exhaust means when it is separated from said vessel opening prior to the beginning delivery of oxygen through said tuyere means, and drawing a substantial quantity of atmospheric air into said hood means by the operation of said gas exhaust means at the end of a third period when said hood means is separated again and after terminating delivery of oxygen through said tuyere means.

7. The method set forth in claim 1 including injecting hydrocarbon fluid through said tuyere means in a separate path but concurrently with the delivery of oxygen thereby to cause hydrogen to evolve from said molten metal, said hydrogen being oxidized by air drawn into said hood means when it is separated substantially from said vessel, the amount of air for stoichiometric combustion including an amount for oxidizing said hydrogen.

8. The method set forth in claim 1 including interrupting said oxygen delivery during a second period when evolution of said off-gas is still high and the carbon monoxide content thereof is still high and simultaneously initiating delivery of nitrogen to inertize the off-gas received in said hood means, whereby to enable catching carbon in said melt at a desired level.

9. The method set forth in claim 1 wherein said combustible constituents include carbon monoxide.

10. The method set forth in claim 1 wherein said combustible constituents include hydrogen.

11. The method set forth in claim 1 wherein said combustible constituents include carbon monoxide principally and a lesser amount of hydrogen.

12. A method of controlling off-gas from a molten metal containing converter vessel having an open mouth over which there is a movable hood means connected to gas exhaust means and which vessel has tuyere means communicating with the interior of the vessel at a level beneath the molten metal surface, comprising:
  containing a quantity of ferrous metal including carbon-containing molten ferrous metal in said converter vessel,
  positioning said hood means a sufficient distance from said vessel mouth during a first portion of a process cycle to draw into said hood means off-gas from said vessel and a substantial quantity of air,
  delivering oxygen through said tuyere means during said first portion of said process cycle to permeate said molten metal for oxidizing some constituents thereof thereby producing off-gas which includes combustible constituents,
  maintaining said hood means a distance from the mouth of said vessel sufficient to draw into said hood at least that amount of air required to produce a substantially non-combustible gaseous mixture in said hood means and exhaust means to substantially purge said gas exhaust means of combustible gases, and
  moving said hood means to reduce the distance thereof from said mouth during a second portion of said process cycle commencing after the passage of said purging non-combustible gaseous mixture through said gas exhaust means whereby to reduce the amount of air drawn into said hood means and exhaust means so that off-gas with a higher proportion of combustible gases may be collected and maintaining a negative pressure within said hood means while continuing the delivery of said oxygen.

13. A method or processing off-gases from a refractory lined metallurgical converter vessel which has tuyere means communicating with the interior thereof below the level of the molten metal and which has an opening over which there is a movable hood means connected to gas exhaust means, in connection with a conversion process cycle, comprising:
  holding ferrous metal including carbon containing molten ferrous metal in said vessel,
  blowing oxygen and hydrocarbon fluid concurrently but in individual paths through said tuyere means for permeating said molten metal thereby producing off-gases including a low amount of carbon monoxide compared with a later period and including hydrogen,
  effecting suction in said hood means with said exhaust means to create an inflow of ambient air,
  positioning said hood means during a first period a distance from said vessel opening sufficient to draw in at least that volume of atmospheric air required for stoichiometric combustion of the combustible constituents of said gases to generate a purging flow of non-combustible gases through said gas exhaust means, the volume of carbon monoxide generally increasing during said first period and the volume of air being drawin in generally correspondingly decreasing after the generation of said purging non-combustible gases,
  passing said non-combustible gases through said hood and exhaust means during said first period,
  reducing the space between said hood means and said vessel opening after the passage of said non-combustible gases through said exhaust means to limit the air drawn into an amount which will not oxidize substantial quantities of the combustible constituents of said off-gases to commence a second period whereby gases of significant calorific value may be collected by means of said exhaust means, and
  continuing to blow said oxygen and hydrocarbon through sid tuyere means during said second period to further oxidize carbon and evolve the oxidation products thereof from said vessel.

14. The method set forth in claim 13 including the steps of:
  discontinuing blowing of oxygen through said tuyere means at a time during said second period when carbon content of said melt and the evolution of carbon monoxide therefrom is high whereby said conversion is discontinued when the carbon content of said metal is high, and
  immediately introducing non-oxidizing gas to mix with the gases in said hood means for diluting and thereby reducing the combustibility of said gases.

15. The method set forth in claim 14 including continuing to operate said exhaust system to draw in a constant volume of gases to thereby limit drawing in substantial air when said non-oxidizing gas in introduced.

16. The method set forth in claim 15 wherein said non-oxidizing gas is nitrogen.

17. The method set forth in claim 13 wherein said gas exhaust means is operated during a process cycle to maintain a negative pressure of −3 to −8 millimeters expressed in terms of a water column height.

18. A method of processing in a gas cleaning system which includes exhaust means and gas flow regulating means the off-gases from a refractory lined metallurgical vessel having tuyere means for delivering oxygen and a hydrocarbon shielding fluid in surrounding relation to the oxygen below the level of the molten metal and an opening over which there is a movable hood means connected to the gas cleaning system,
  blowing oxygen and hydrocarbon fluid in surrounding relation to said oxygen through said tuyere means for oxidizing some constituents of said molten metal thereby producing combustible off-gases including carbon monoxide and hydrogen,
  positioning said hood means a sufficient distance from said vessel opening during a first period to enable drawing in sufficient air to oxidize said combustible constituents,
  maintaining said hood means said sufficient distance from vessel mouth during the first period as combustible constituents production is increasing until substantially stoichiometric conditions of combustion exist between said combustible constituents and oxygen from said drawn in air to thereby produce a substantially inert gaseous mixture in said hood means and gas cleaning system for purging said gas cleaning system substantially of combustible constituents,
  continuing to deliver oxygen and hydrocarbon fluid while reducing the space between said hood means and vessel opening during a second period and after the passage of said purging gas through said gas cleaning system to thereby reduce the air drawn in so that the increased quantity of combustible constituents and other off-gases produced during an ensuing continuous oxygen delivery period do not undergo substantial combustion, continuing to deliver oxygen through said tuyres during said second period continuous with said first period until the quantity of combustible constituents in the off-gas from said molten metal is diminished substantially, and increasing the space between said hood means and said vessel opening over an interval starting with the beginning of a third period to thereby permit drawing in sufficient air to substantially completely oxidize the combustible constituents of said off-gases and again produce a substantially inert gaseous mixture in said hood and gas exhaust means.

19. The method set forth in claim 18 and including the step of providing a suction in said gas cleaning system for establishing a negative pressure in said hood means relative to ambient air pressure.

20. The method set forth in claim 19 and including the step of adjusting gas flow regulating means in said gas cleaning system to maintain said negative pressure within preselected limits.

21. The method set forth in claim 20 and including the step of measuring the pressure within said hood means and adjusting said gas flow regulating means to maintain said negative pressure within preselected limits.

22. The method set forth in claim 19 and including the step of measuring the pressure within said hood means and adjusting the position of said hood means relative to said vessel opening to maintain said negative pressure within preselected limits.

23. The method set forth in claim 18 and including the step of determining the partial pressure of said off-gases during said first period and reducing the space between said hood means and said vessel opening to terminate said first period and commence said second period when said gas partial pressures indicate substantial stoichiometric conditions in said gases.

24. The method set forth in claim 23 and including the step of measuring the partial pressure of carbon monoxide and hydrogen in said off-gases during said second period and separating said hood means a greater distance from said vessel opening to commence a third period and thereby increase the inflow of air so that stoichiometric conditions again occur in said hood means and gas cleaning system.

25. A method of operating a gas cleaning system for receiving off-gases from a quantity of molten carbon containing ferrous metal in a converter vessel having an opening and tuyere means communicating with the interior thereof at a level beneath the molten metal surface wherein said gas cleaning system includes a primary hood movable towards and away from said vessel opening and an auxiliary hood disposed adjacent said primary hood and adopted to collect emissions from the vessel when the latter is not aligned with the primary hood, wherein said gas cleaning system includes series connected first gas cleaning means having first flow control means and second gas cleaning means having second flow control means, the method comprising:

delivering oxygen through said tuyere means and beneath the level of molten metal for oxidizing carbon therein and producing off-gas having combustible constituents, positioning said primary hood adjacent said vessel opening for collecting said off-gases, tilting said vessel to move said opening away from said primary hood, connecting said auxiliary hood to said second gas cleaning means, and adjusting said first flow control means to minimize the flow of gas through said first gas cleaning means, and injecting nitrogen into said primary hood.

26. The method set forth in claim 25 and injecting a hydrocarbon shielding fluid in surrounding relation to said oxygen, and terminating the delivery of oxygen and hydrocarbon shielding fluid and delivering an inert gas into said vessel through said tuyere means when said vessel is tilted.

27. The method set forth in claim 26 wherein said inert gas in nitrogen.

28. The method set forth in claim 27 and initiating delivery of said inert gas shortly before said vessel is tilted and continuing said inert gas delivery for a short interval after vessel is returned to its untilted position.

29. The method set forth in claim 13 and including the step of maintaining a negative pressure within said hood during said second period.

30. The method set forth in claim 29 and including the step of measuring the pressure within said hood and maintaining the pressure therein within predetermined limits in accordance with said pressure measurements.

31. The method set forth in claim 30 wherein said gas exhaust means includes gas flow regulating means, and adjusting the gas flow regulating means to control the flow of gas therethrough in accordance with said pressure measurements and thereby to control the pressure within said hood.

32. The method set forth in claim 25 and including the steps of elevating said primary hood prior to the tilting of said vessel, untilting said vessel to align the same with said primary hood, lowering said primary hood toward said vessel and disconnecting said auxiliary hood from said gas cleaning means, and controlling the pressure within said primary hood to maintain a negative pressure therein.

* * * * *